United States Patent
Hao et al.

(10) Patent No.: US 12,503,404 B2
(45) Date of Patent: Dec. 23, 2025

(54) ABLATION-RESISTANT HIGH-ENTROPY CARBIDE-HIGH-ENTROPY DIBORIDE-SILICON CARBIDE MULTIPHASE CERAMIC AND PREPARATION THEREOF

(71) Applicant: Zhejiang Normal University, Jinhua (CN)

(72) Inventors: Wei Hao, Jinhua (CN); Xinyue Chen, Jinhua (CN); Chunni Zhou, Jinhua (CN); Xiaoxian Qin, Jinhua (CN); Dongyun Wang, Jinhua (CN)

(73) Assignee: Zhejiang Normal University, Jinhua (CN)

( * ) Notice: Subject to any disclaimer, the term of this patent is extended or adjusted under 35 U.S.C. 154(b) by 532 days.

(21) Appl. No.: 18/153,117

(22) Filed: Jan. 11, 2023

(65) Prior Publication Data

US 2023/0167029 A1 Jun. 1, 2023

(30) Foreign Application Priority Data

Apr. 28, 2022 (CN) .......................... 202210471446.7

(51) Int. Cl.
  *C04B 35/65* (2006.01)
  *C04B 35/58* (2006.01)
  *C04B 35/626* (2006.01)

(52) U.S. Cl.
  CPC .. *C04B 35/58078* (2013.01); *C04B 35/58071* (2013.01); *C04B 35/62615* (2013.01); *C04B 35/6264* (2013.01); *C04B 35/65* (2013.01); *C04B 2235/3232* (2013.01); *C04B 2235/3244* (2013.01); *C04B 2235/3251* (2013.01); *C04B 2235/3813* (2013.01); *C04B 2235/3826* (2013.01); *C04B 2235/424* (2013.01); *C04B 2235/5436* (2013.01); *C04B 2235/5445* (2013.01); *C04B 2235/5454* (2013.01);
  (Continued)

(58) Field of Classification Search
  CPC ................................................ C04B 2235/424
  See application file for complete search history.

(56) References Cited

U.S. PATENT DOCUMENTS

2021/0179499 A1* 6/2021 Hao .................. C04B 35/62655

FOREIGN PATENT DOCUMENTS

| CN | 110204341 A | 9/2019 |
| CN | 110606749 A | 12/2019 |

(Continued)

OTHER PUBLICATIONS

Z. Peng et al., "Novel refractory high-entropy ceramics: Transition metal carbonitrides with superior ablation resistance", Corrosion Science, 2021, vol. 184, 109359.

(Continued)

*Primary Examiner* — Ian A Rummel

(57) ABSTRACT

A method for preparing an ablation-resistant high-entropy carbide-high-entropy diboride-silicon carbide (SiC) multiphase ceramic, including: (S1) mixing a transition metal oxide mixed powder, nano carbon black and a silicon hexaboride ($SiB_6$) powder to obtain a precursor powder; and (S2) subjecting the precursor powder to pressureless sintering to obtain the high-entropy carbide-high-entropy diboride-SiC multiphase ceramic with a relative density of 96% or more.

6 Claims, 2 Drawing Sheets

(52) U.S. Cl.
CPC ............... C04B 2235/604 (2013.01); C04B 2235/6562 (2013.01); C04B 2235/6565 (2013.01); C04B 2235/6567 (2013.01); C04B 2235/6581 (2013.01); C04B 2235/77 (2013.01); C04B 2235/96 (2013.01)

(56) References Cited

FOREIGN PATENT DOCUMENTS

| | | |
|---|---|---|
| CN | 110627508 A | 12/2019 |
| CN | 112408984 A | 2/2021 |
| CN | 112521911 A | 3/2021 |
| CN | 112830785 A | 5/2021 |
| CN | 114000028 A | 2/2022 |
| JP | S6050903 A | 3/1985 |
| WO | 2021179654 A1 | 9/2021 |

OTHER PUBLICATIONS

H. X. Wang et al., "Oxidation behavior of high-entropy carbide (Hf0.2Ta0.2Zr0.2Ti0.2Nb0.2)C at 1400-1600° C.", Ceramics International, 2021, vol. 47, No. 8, pp. 10848-10854.

H. X. Wang et al., "Oxidation behavior of (Hf0.2Ta0.2Zr0.2Ti0.2Nb0.2)C—xSiC ceramics at high temperature", Ceramics International, 2020, vol. 46, No. 8, pp. 12260-11168.

B. L. Ye et al., "High-temperature oxidation behavior of (Hf0.2Zr0.2Ta0.2Nb0.2Ti0.2) Chigh-entropy ceramics in air", Journal of the American Ceramic Society, 2020, vol. 103, No. 1, pp. 500-507.

J. X. Liu et al., "Mechanical properties of hot-pressed high-entropy diboride-based ceramics", Journal of Advanced Ceramics, 2020, vol. 9, No. 4, pp. 503-510.

K. Lu et al., "Microstructures and mechanical properties of high-entropy (Ti0.2Zr0.2Hf0.2Nb0.2Ta0.2)C ceramics with the addition of SiC secondary phase", Journal of the European Ceramic Society, 2020, vol. 40, No. 5, pp. 1839-1847.

M. D. Qin et al., "Dual-phase high-entropy ultra-high temperature ceramics", Journal of the European Ceramic Society, 2020, vol. 40, No. 15, pp. 5037-5050.

M. Biesuz et al., "Solidification microstructures of multielement carbides in the high entropy Zr—Nb—Hf—Ta-Cx system produced by arc melting", Scripta Materialia, 2021, vol. 203, 114091.

A. Y. Pak et al., "Synthesis of transition metal carbides and high-entropy carbide TiZrNbHfTaC5 in self-shielding DC arc discharge plasma", Ceramics International, 2022, vol. 48, No. 3, pp. 3818-3825.

W. Zhang et al., "Densification, microstructure and mechanical properties of multicomponent (TiZrHfNbTaMo)C ceramic prepared by pressureless sintering", Journal of Materials Science &Technology, 2021, vol. 72, pp. 23-28.

D. Yu et al., "Pressureless sintering and properties of (Hf0.2Zr0.2Ta0.2Nb0.2Ti0.2)C high-entropy ceramics: The effect of pyrolytic carbon", Journal of the European Ceramic Society, 2021, vol. 41, No. 6, pp. 3823-3831.

Shen X et al., "Preparation and characterization of diboride-based high entropy (Ti0.2Zr0.2Hf0.2Nb0.2Ta0.2)B2—SiC particulate composites", Ceramics International, 2019, vol. 45, pp. 24508-24514.

Hao W et al., "Strong and tough HfC—HfB2 solid-solution composites obtained by reactive sintering with a SiB6 additive", Ceramics International, 2020, vol. 46, pp. 16257-16265.

Yu D et al., "Densifying (Hf0.2Zr0.2Ta0.2Nb0.2Ti0.2)C high-entropy ceramics by two-step pressureless sintering", Journal of the American Ceramic Society, 2021, pp. 76-81.

* cited by examiner

ABLATION-RESISTANT HIGH-ENTROPY CARBIDE-HIGH-ENTROPY DIBORIDE-SILICON CARBIDE MULTIPHASE CERAMIC AND PREPARATION THEREOF

CROSS-REFERENCE TO RELATED APPLICATIONS

This application claims the benefit of priority from Chinese Patent Application No. 202210471446.7, filed on Apr. 28, 2022. The content of the aforementioned application, including any intervening amendments thereto, is incorporated herein by reference in its entirety.

TECHNICAL FIELD

This application relates to thermal protection materials, and more particularity to an ablation-resistant high-entropy carbide-high-entropy diboride-silicon carbide (SiC) multiphase ceramic and a preparation thereof.

BACKGROUND

At present, it is urgent to develop ultra-high temperature structural materials with high temperature resistance (>2000° C.), and oxidation and ablation resistance (such as oxidation resistance and resistance to mechanical erosion and shear) in extreme environment for the thermal protection system and critical component for thermal structure of hypersonic flight vehicle. High-entropy carbide ceramics are solid solutions of single-phase inorganic compounds with NaCl structure formed by 5 or more transition metal elements in equimolar or near-equal atomic ratios and carbon elements. The entropy-stabilized single-phase structure has brought about four core effects for high-entropy carbide ceramics: (i) high-entropy effect, which expands the solution limits between elements and offers the stability for the formation of random solid solutions; (ii) severe lattice distortion, which contributes to strengthening and hardening; (iii) kinetically sluggish diffusion effect, which retards the growth of second phase nanoparticles; and (iv) cocktail effect, which provides unexpected performances after mixing many elements. Compared with single-component or binary carbide ceramics, the high-entropy carbide ceramic not only has excellent high-temperature stability, high-temperature strength and creep resistance, and higher elastic modulus and hardness, but also possesses better oxidation resistance. Therefore, the high-entropy carbide ceramic is considered to be the most promising material for the thermal protection system, and critical components of the thermal structure, such as nose cone and wing leading edge for the hypersonic flight vehicles.

It has been demonstrated by theoretical calculations and experimental researches concerning the high-entropy carbide formation that the high-entropy carbide ceramic with $(Hf_{0.2}Zr_{0.2}Ta_{0.2}Nb_{0.2}Ti_{0.2})C$ system has the optimal high-temperature stability and comprehensive performance, and thus it has attracted considerable attention. Unfortunately, the five kinds of transition metal elements in the $(Hf_{0.2}Zr_{0.2}Ta_{0.2}Nb_{0.2}Ti_{0.2})C$ ceramic vary in oxidation rate (hafnium (Hf)>zirconium (Zr)>titanium (Ti)>tantalum (Ta)>niobium (Nb)), leading to the formation of a multi-layer oxides structure after high-temperature oxidation. Moreover, the oxide layer is prone to peeling off and spallation due to the residual stress and high temperature creep in the oxide layer, which will greatly weaken its oxidation resistance. Furthermore, the porous and loose oxide layers are easily formed on the $(Hf_{0.2}Zr_{0.2}Ta_{0.2}Nb_{0.2}Ti_{0.2})C$ ceramic surface, which are easy to be mechanically scouring, further causing the failure of the ceramic matrix. Therefore, the high-temperature oxidation and ablation resistance of the high-entropy carbide ceramics have attracted more attention, which plays significant roles in their applications in extreme environments.

Recently, several strategies have been proposed to improve the oxidation and ablation resistance of the high-entropy carbide ceramics, among which the following two approaches are predominant.

(1) Z. Peng et al. (Z. Peng, W. Sun, X. Xiong, et al. Novel refractory high-entropy ceramics: Transition metal carbonitrides with superior ablation resistance[J]. Corrosion Science, 2021, 184: 109359) published a doping modification method, in which the carbon (C) element in the $(Hf_{0.2}Zr_{0.2}Ta_{0.2}Nb_{0.2}Ti_{0.2})C$ ceramic was partially substituted with nitrogen (N) element. The substitution of the non-metallic element causes lattice distortion in the high-entropy system again, leading to a gradient distribution of oxides in the oxide layer after ablation. The porous Hf—Zr composite oxide is formed at the ablation center areas, while the molten-like Ta—Nb composite oxide exhibits at the ablation bound areas. With the increase of the ablation temperature and the extension of the ablation time, the porous structure provides channels for 02 diffusion, and the Ta—Nb composite oxides were too viscous and poor flowability to heal the pores in the oxide layer, such that the matrix will be inevitably oxidized, leading to the failure.

(2) H. X. Wang et al. published a preparation of high-entropy carbide $(Hf_{0.2}Zr_{0.2}Ta_{0.2}Nb_{0.2}Ti_{0.2})C$ ceramic (H. X. Wang, X. Han, W. Liu, et al. Oxidation behavior of $(Hf_{0.2}Ta_{0.2}Zr_{0.2}Ti_{0.2}Nb_{0.2})C$ ceramic at 1400-1600° C. [J]. Ceramics International, 2021, 47(8): 10848-10854) and a preparation of $(Hf_{0.2}Ta_{0.2}Zr_{0.2}Ti_{0.2}Nb_{0.2})C$-xSiC ceramic (H. X. Wang, Y J. Cao, W. Liu, et al. Oxidation behavior of $(Hf_{0.2}Ta_{0.2}Zr_{0.2}Ti_{0.2}Nb_{0.2})C$-xSiC ceramics at high temperature[J]. Ceramics International, 2020, 46(8): 11160-11168). In view of the reports, the outward diffusion and volatilization of gaseous titanium oxide (TiO) leads to the formation of a large number of pores in the oxide layer during the oxidation process of the single-phase $(Hf_{0.2}Ta_{0.2}Zr_{0.2}Ti_{0.2}Nb_{0.2})C$ ceramics. Meanwhile, due to the selective oxidation of transition metals, Hf, Zr, and Ti synergistically inhibit the diffusion of Ta and Nb. The oxidation of Hf, Zr and Ti is more obvious at high temperatures, while Ta and Nb more slowly oxidize, resulting in the formation of porous and loose oxides with a multi-layer structure. It is detrimental to its oxidation resistance. In terms of $(Hf_{0.2}Ta_{0.2}Zr_{0.2}Ti_{0.2}Nb_{0.2})C$—SiC ceramic, it is prepared by introducing SiC into the $(Hf_{0.2}Zr_{0.2}Ta_{0.2}Nb_{0.2}Ti_{0.2})C$ ceramic. A dense silicate oxide protective layer is formed and the pores caused through the gaseous TiO escape were eliminated, such that the oxidation resistance of the high-entropy carbide is effectively enhanced. Whereas, the introduction of excess silicon (Si) competes for oxygen ($O_2$) will further cooperate with Hf, Zr, and Ti to inhibit the diffusion of Ta and Nb. After a long-time oxidation, the oxide with loose and multi-layer structure will be formed, which will reduce its oxidation resistance. Accordingly, it is necessary to balance the formation of dense oxide layer after oxidation and ablation of high-entropy ultra-high temperature multiphase ceramics and self-healing of oxidation holes produced by gas volatilization.

By introducing boron (B) into the high-entropy carbide-SiC multiphase ceramic, the formation of boron oxide ($B_2O_3$) through high temperature ablation and oxidation can effectively regulate the viscosity and fluidity of the silicate oxide layer, which allows the formation of dense oxide layer rich in Si and B, and also can self-heal defects such as oxidation holes in time, so as to achieve the effective oxidation protection. In addition, the $B_2O_3$ with low melting point and the volatile gas will escape, which reduces heat on the ceramic surface, and is beneficial for the release of thermal stress in the oxide layer, contributing to an ultra-high temperature "self-sudation" cooling. Accordingly, it proposes a new method to prepare a high-entropy carbide-high-entropy diboride-SiC multiphase ceramic by introducing Si and B into the high-entropy carbides.

So far, the main methods for preparing high entropy ultra-high temperature multiphase ceramics include hot pressing, spark plasma sintering (SPS), arc melting and pressureless sintering. Chu Yanhui from South China University of Technology proposed a method for preparing $(Hf_{0.2}Zr_{0.2}Ta_{0.2}Nb_{0.2}Ti_{0.2})C$ ceramic through hot pressing (B. L. Ye, T. Q. Wen, Y H. Chu. High-temperature oxidation behavior of $(Hf_{0.2}Zr_{0.2}Ta_{0.2}Nb_{0.2}Ti_{0.2})C$ high-entropy ceramics in air [J]. Journal of the American Ceramic Society, 2020, 103(1): 500-507). Liu Jixuan of Donghua University proposed a method for preparing $(Ti_{0.2}Zr_{0.2}Hf_{0.2}Nb_{0.2}Ta_{0.2})B_2$—SiC multiphase ceramic through hot pressing (J. X. Liu, X. Q. Shen, Y Wu, et al. Mechanical properties of hot-pressed high-entropy diboride-based ceramics [J]. Journal of Advanced Ceramics, 2020, 9(4): 503-510). Whereas, these hot pressing methods only suitable for preparing small size samples, not large size and complex-shaped ceramics. Moreover, there is a method for preparing high-entropy $(Hf_{0.2}Zr_{0.2}Ta_{0.2}Ti_{0.2}Nb_{0.2})C$—SiC multiphase ceramic through SPS (K. Lu, J. X. Liu, X. F. Wei, et al. Microstructures and mechanical properties of high-entropy $(Ti_{0.2}Zr_{0.2}Hf_{0.2}Nb_{0.2}Ta_{0.2})C$ ceramics with the addition of SiC secondary phase [J]. Journal of the European Ceramic Society, 2020, 40(5): 1839-1847), which employed $(Hf_{0.2}Zr_{0.2}Ta_{0.2}Ti_{0.2}Nb_{0.2})C$ and SiC powders as raw materials. Although the SPS enables rapid sintering densification of high-entropy multiphase ceramics, the external addition of SiC may lead to inhomogeneous distribution of SiC in the multiphase ceramics. Luo Jian of University of California, San Diego, proposed a method for preparing a (TiZrNbHfTaW)C—(TiZrNbHfTaW)$B_2$ multiphase ceramics through SPS (M. D. Qin, J. Gild, C. Z. Hu, et al. Dual-phase high-entropy ultra-high temperature ceramics [J]. Journal of the European Ceramic Society, 2020, 40(15): 5037-5050). However, the high-entropy ultra-high temperature ceramics prepared through SPS has low activation energy for reactions between carbides and between diborides, and reactive sintering densification is more difficult, such that it should be at 2200° C. to complete the solid solution, which leads to abnormal grain growth and porosity at grain boundaries. Furthermore, SPS can only prepare small-sized samples, and cannot be used for the preparation of complex-shaped and large-sized samples. There is also a preparation method of high-entropy carbides ceramics through arc melting, such as M. Biesuz et al. (M. Biesuz, T. G. Saunders, J. Veverka, et al. Solidification microstructures of multielement carbides in the high entropy Zr—Nb—Hf—Ta-Cx system produced by arc melting [J]. Scripta Materialia, 2021, 203: 114091), and A. Y Pak et al. (A. Y Pak, P. S. Grinchuk, A. A. Gumovskaya, et al. Synthesis of transition metal carbides and high-entropy carbide TiZrNbHfTaC$_5$ in self-shielding DC arc discharge plasma [J]. 2022, 48(3): 3818-3825). Regarding the arc melting, it may cause segregation of high-entropy metal and non-metal elements in the high temperature melting process, leading to a core-edge structure. It is detrimental to the structure and performances of materials. W. Zhang et al. (W. Zhang, L. Chen, C. G. Xu, et al. Densification, microstructure and mechanical properties of multicomponent (TiZrHfNbTaMo)C ceramic prepared by pressureless sintering [J]. Journal of Materials Science & Technology, 2021, 72: 23-28) and D. Yu et al. (D. Yu, J. Yin, B. H. Zhang, et al. Pressureless sintering and properties of $(Hf_{0.2}Zr_{0.2}Ta_{0.2}Nb_{0.2}Ti_{0.2})C$ high-entropy ceramics: The effect of pyrolytic carbon [J]. Journal of the European Ceramic Society, 2021, 41(6): 3823-3831) proposed a preparation method through pressureless sintering.

Regarding the preparation of high-entropy carbide ceramics, the traditional pressureless sintering employs transition metal oxides or carbides as raw materials, such that the sintering activity of the reaction system is low, leading to high sintering activation energy and sintering temperature of 2200-2500° C., which causes abnormal grain growth. Moreover, the increase of the sintering temperature leads to an increase in the grain boundary migration rate, which will result in the formation of intragranular closed pores in the ceramics. It finally causes the crack initiation and propagation.

SUMMARY

In order to overcome the defects in the prior art, this application provides an ablation-resistant high-entropy carbide-high-entropy diboride-SiC multiphase ceramic, which has simple preparation, low cost and controllable element composition, microstructure and bulk size. This application also provides a preparation method of the multiphase ceramic, in which silicon hexaboride ($SiB_6$) is employed as Si and B source to prepare a multiphase ceramic using pressureless sintering through synergetic effect of carbon-boron-silicification reaction and solid solution. Si and B in the multiphase ceramic can synergistically induce the formation of a dense and stable oxide protective layer after the ablation, which enhances its high-temperature oxidation and ablation resistance.

Regarding the carbon-boron-silicification and solid solution synergistic pressureless sintering, $SiB_6$ is employed as the Si source and B source, and nano carbon black is employed as C source; and the carbon-boron thermal reduction, silicification, solid solution and stepwise pressureless sintering are integrated to promote the densification.

Technical solutions of the present disclosure are described as follows.

This application provides a method for preparing an ablation-resistant high-entropy carbide-high-entropy diboride-silicon carbide (SiC) multiphase ceramic, comprising:
  (S1) mixing a transition metal oxide mixed powder, nano carbon black and a $SiB_6$ powder to obtain a precursor powder; and
  (S2) subjecting the precursor powder to pressureless sintering to obtain the high-entropy carbide-high-entropy diboride-SiC multiphase ceramic;
    wherein a relative density of the high-entropy carbide-high-entropy diboride-SiC multiphase ceramic is 96% or more.

In some embodiments, a molar ratio of transition metal atoms of the transition metal oxide mixed powder to the nano carbon black to the SiB$_6$ powder is (1-20):(1-64):(0-8), preferably (15-20):(48-64):(4-8), and more preferably (18-20):(60-64):8.

In some embodiments, the transition metal oxide mixed powder comprises hafnium oxide (HfO$_2$), zirconium dioxide (ZrO$_2$), tantalum pentoxide (Ta$_2$O$_5$), niobium (V) oxide (Nb$_2$O$_5$) and titanium dioxide (TiO$_2$) in a molar ratio of 2:2:1:1:2.

In some embodiments, a particle size of the transition metal oxide mixed powder is 100 nm; a particle size of the nano carbon black is 50 nm; and a particle size of the SiB$_6$ powder is 3-8 μm.

In some embodiments, step (S1) comprises:
(S1-1) subjecting HfO$_2$, ZrO$_2$, Ta$_2$O$_5$, Nb$_2$O$_5$ and TiO$_2$ to ball milling and drying to obtain the transition metal oxide mixed powder; and
(S1-2) subjecting the transition metal oxide mixed powder, the nano carbon black and the SiB$_6$ powder to ball milling and drying to obtain the precursor powder.

In some embodiments, in step (S1-1), the ball milling is performed in isopropyl alcohol at 200-600 rpm for 8-60 h, and a ratio of a total weight of HfO$_2$, ZrO$_2$, Ta$_2$O$_5$, Nb$_2$O$_5$ and TiO$_2$ to a weight of balls is 1:(10-20); and in step (S1-2), the ball milling is performed in isopropyl alcohol at 200-600 rpm for 8-60 h, and a ratio of a total weight of the transition metal oxide mixed powder, the nano carbon black and the SiB$_6$ powder to a weight of balls is 1:(10-20).

In some embodiments, in step (S1-1), the ball milling is performed for 24-60 h; and in step (S1-2), the ball milling is performed for 8-36 h.

In some embodiments, a maximum temperature of the pressureless sintering is 1900-2100° C.; and the pressureless sintering is performed for 1-9 h.

In some embodiments, the pressureless sintering is performed in a stepwise manner through the following temperature program: rising from room temperature to 1900-2100° C. at a rate of 10-50° C./min; 1900-2100° C. for 5-30 min; decreasing to 1600-1900° C. at a rate of 50-100° C./min; 1600-1900° C. for 1-8 h; and decreasing to room temperature at a rate of 10-50° C./min; wherein a vacuum degree of the pressureless sintering is controlled at 0.001-0.05 Pa.

In some embodiments, before the pressureless sintering, the precursor powder is pre-pressed into a cylindrical blank by cold isostatic pressing.

Regarding the preparation method provided herein, SiB$_6$ is employed as Si source and B source; nano carbon black is employed as carbon source; and transition metal oxide is employed as the corresponding transition metal source to prepare the high-entropy carbide-high-entropy diboride-SiC multiphase ceramic using pressureless sintering through synergistic effect of carbon-boron-silicification reaction and solid solution. By adjusting the type and phase composition of transition metal elements, high-entropy multiphase ceramics with superior high-temperature oxidation and ablation resistance are fabricated. Through the combination of carbon-boron-siliconization reaction and solid solution, the diffusion and mass transfer can be effectively promoted, and the sintering activation energy is improved, such that rapid sintering densification of the high-entropy multiphase ceramic is enabled, and the defects of excessive sintering temperature and abnormal grain growth in the conventional preparation methods are overcome. Moreover, compared to the hot-pressing sintering and spark plasma sintering (SPS) that are only suitable for the preparation of small-size ceramics, the pressureless sintering is applicable to the fabrication of high-entropy ultra-high temperature multiphase ceramics with any shape and size. The one-step sintering contributes to the effective compounding of high-entropy carbide, high-entropy diboride and silicon carbide ceramics. The dense and stable oxide layers can be formed after ablative oxidation of ceramics under the induction of Si and B, which can prevent the oxygen diffusion and effectively resist to mechanical scouring, ultimately improving the oxidation and ablation resistance of the high-entropy ultra-high temperature multiphase ceramics. In conclusion, the method provided herein has simple operation, low cost and controllable elemental composition, structure and bulk size, and thus exhibits a broad development prospect.

Compared to the prior art, this application has the following beneficial effects.
(1) The method provided herein can prepare high-entropy ultra-high temperature ceramics with complex shape and large size.
(2) The method provided herein reduces the reaction activation energy through carbon-boron-silicification reaction and solid solution, achieves sintering densification at a lower temperature, and avoids the occurrence of abnormal grain growth and intracrystalline closed pores caused by high temperature and long-time sintering.
(3) The stepwise sintering enables the rapid sintering densification at a higher temperature (a relative density up to about 80%), and then reaches the desired densification degree through rapid cooling to a lower temperature, which can effectively control the ceramic grain size and grain boundary migration rate, facilitating the production of high-entropy ultra-high temperature multiphase ceramics with uniform structure and small and dense grains.
(4) This application enables the one-step compounding of the high-entropy carbide, high-entropy boride and silicon-based ceramics. Si and B synergistically induce the formation of dense and stable Si- and B-rich dense oxide layers after the ablation. In consequence, the oxidation and ablation resistance of the high-entropy ultra-high temperature multiphase ceramics are greatly improved.
(5) The escape of boron oxide with a low melting point and volatile gases will produce "self-sudation" cooling effect, further improving the ablation resistance of the high-entropy ultra-high temperature multiphase ceramics.
(6) The ablation-resistant high-entropy carbide-high-entropy diboride-SiC multiphase ceramic prepared by the method is uniform and dense, and has excellent properties.

DETAILED DESCRIPTION OF EMBODIMENTS

Figure 1:
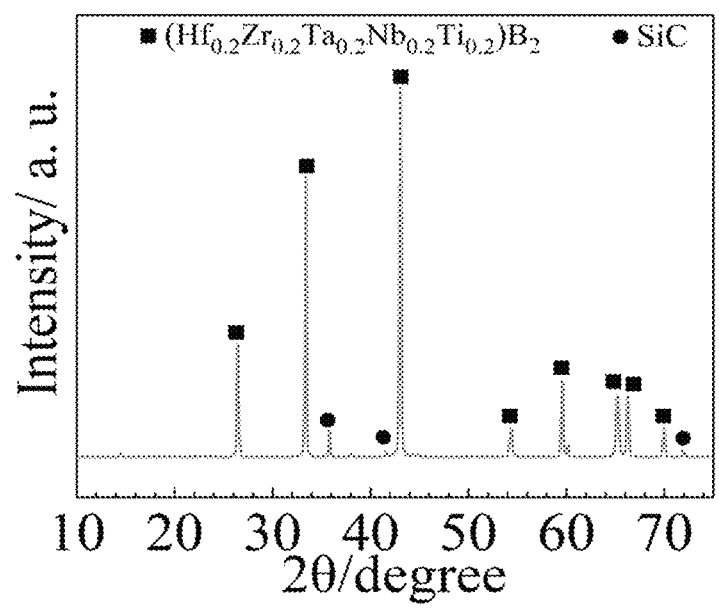
FIG. 1 shows an X-ray diffraction (XRD) pattern of a high-entropy carbide-high-entropy diboride-SiC multiphase ceramic prepared in Example 2.

Technical solutions of the present disclosure will be clearly and completely described below with reference to the embodiments and accompanying drawings. Obviously, provided herein are merely some embodiments of this disclosure, which are not intended to limit the disclosure.

The disclosure provides a method for preparing an ablation-resistant high-entropy carbide-high-entropy diboride-SiC multiphase ceramic, which includes the following steps.

(S1) Commercially-available $HfO_2$ powder, $ZrO_2$ powder, $Ta_2O_5$ powder, $Nb_2O_5$ powder and $TiO_2$ powder (particle size: about 100 nm, and purity≥99.9%) are mixed by ball milling in a planetary ball mill in a molar ratio of 2:2:1:1:2 to obtain a mixed powder, where the ball milling is performed in isopropyl alcohol at 200-600 rpm for 24-60 h, and a weight ratio of the mixed powder to balls is 1:(10-20). Then the mixed powder is dried, and ground in an agate mortar.

(S2) The mixed powder, nano carbon black (50 nm) and $SiB_6$ powder (3-8 μm) are subjected to ball milling in a planetary ball mill to obtain a precursor powder, in which a molar ratio of transition metal atoms of the mixed powder to the nano carbon black to the $SiB_6$ powder is (1-20):(1-64):(0-8), and a molar content of the $SiB_6$ powder is greater than zero; the ball milling is performed in isopropyl alcohol at 200-600 rpm for 8-36 h; and a weight ratio of the precursor powder to balls is 1:(10-20).

(S3) The precursor powder is pre-pressed into a cylindrical blank by cold isostatic pressing, and is subjected to stepwise pressureless sintering through the following temperature program to obtain the uniform and dense high-entropy carbide-high-entropy diboride-SiC multiphase ceramic with a relative density of 96-100%: rising from room temperature to 1900-2100° C. at a rate of 10-50° C./min; 1900-2100° C. for 5-30 min; decreasing to 1600-1900° C. at a rate of 50-100° C./min; 1600-1900° C. for 1-8 h; and decreasing to room temperature at 10-50° C./min, where a vacuum degree is controlled at 0.001-0.05 Pa.

The above-mentioned transition metal oxide nano powders ($HfO_2$ powder, $ZrO_2$ powder, $Ta_2O_5$ powder, $Nb_2O_5$ powder and $TiO_2$ powder, purity≥99.9%) are manufactured by Shanghai Chaowei Nano Technology CO., Ltd; purity of isopropyl alcohol: ≥99.8%; the nano carbon black is produced by Beijing Innochem Science & Technology CO., Ltd, purity≥99.9%; and the $SiB_6$ powder is produced by Alfa Aesar, purity≥98%.

Instruments: QM-3 SP4 planetary ball mill produced by Nanjing University; DHG-9075A electric thermostatic drying oven produced by SHANGHAI YIHENG INSTRUMENTS CO., Ltd; ZT-50-22Y vacuum graphite tube sintering furnace produced by Shanghai Chenhua Technology Co., Ltd.

The disclosure will be described in detail below with reference to the embodiments.

Example 1

Provided was a method for preparing an ablation-resistant high-entropy carbide-high-entropy diboride-SiC multiphase ceramic, which included the following steps.

(S1) Commercially-available $HfO_2$ powder, $ZrO_2$ powder, $Ta_2O_5$ powder, $Nb_2O_5$ powder and $TiO_2$ powder (particle size: about 100 nm, and purity≥99.9%) were mixed by ball milling in a planetary ball mill in a molar ratio of 2:2:1:1:2 to obtain a mixed powder, where the ball milling was performed in isopropyl alcohol at 500 rpm for 24 h, and a weight ratio of the mixed powder to balls was 1:10. Then the mixed powder was dried, and grounded in an agate mortar.

(S2) The mixed powder, nano carbon black (50 nm) and $SiB_6$ powder (3-8 μm) were subjected to ball milling in a planetary ball mill to obtain a precursor powder, in which a molar ratio of transition metal atoms of the mixed powder to the nano carbon black to the $SiB_6$ powder was 5:14:1; the ball milling was performed in isopropyl alcohol at 550 rpm for 12 h; and a weight ratio of the precursor powder to balls was 1:10.

(S3) The precursor powder was pre-pressed into a cylindrical blank by cold isostatic pressing, and was subjected to stepwise pressureless sintering through the following temperature program to obtain the uniform and dense high-entropy carbide-high-entropy diboride-SiC multiphase ceramic with a relative density of 97.5%: rising from room temperature to 1900° C. at a rate of 50° C./min; 1900° C. for 30 min; decreasing to 1750° C. at a rate of 100° C./min; 1750° C. for 7 h; and decreasing to room temperature at 50° C./min, where a vacuum degree was controlled at 0.001 Pa.

Example 2

Provided was a method for preparing an ablation-resistant high-entropy carbide-high-entropy diboride-SiC multiphase ceramic, which included the following steps.

(S1) Commercially-available $HfO_2$ powder, $ZrO_2$ powder, $Ta_2O_5$ powder, $Nb_2O_5$ powder and $TiO_2$ powder (particle size: about 100 nm, and purity≥99.9%) were mixed by ball milling in a planetary ball mill in a molar ratio of 2:2:1:1:2 to obtain a mixed powder, where the ball milling was performed in isopropyl alcohol at 450 rpm for 36 h, and a weight ratio of the mixed powder to balls was 1:15. Then the mixed powder was dried, and grounded in an agate mortar.

(S2) The mixed powder, nano carbon black (50 nm) and $SiB_6$ powder (3-8 μm) were subjected to ball milling in a planetary ball mill to obtain a precursor powder, in which a molar ratio of transition metal atoms of the mixed powder to the nano carbon black to the $SiB_6$ powder was 5:13:2; the ball milling was performed in isopropyl alcohol at 500 rpm for 24 h; and a weight ratio of the precursor powder to balls was 1:15.

(S3) The precursor powder was pre-pressed into a cylindrical blank by cold isostatic pressing, and was subjected to stepwise pressureless sintering through the following temperature program to obtain the uniform and dense high-entropy carbide-high-entropy diboride-SiC multiphase ceramic with a relative density more than 98%: rising from room temperature to 1950° C. at a rate of 40° C./min; 1950° C. for 25 min; decreasing to 1700° C. at a rate of 80° C./min; 1700° C. for 6 h; and decreasing to room temperature at 40° C./min, where a vacuum degree was controlled at 0.008 Pa.

Referring to FIG. 1, the high-entropy carbide-high-entropy diboride-SiC multiphase ceramic provided herein had great crystallinity, and mainly included two phases, respectively $(Hf_{0.2}Zr_{0.2}Ta_{0.2}Nb_{0.2}Ti_{0.2})B_2$ and SiC, where the primary phase was $(Hf_{0.2}Zr_{0.2}Ta_{0.2}Nb_{0.2}Ti_{0.2})B_2$, which corresponded to a hexagonal phase $HfB_2$ PDF NO. 38-1398 and a hexagonal phase $NbB_2$ PDF NO. 35-0742; and a secondary phase was SiC, which corresponded to a cubic phase SiC PDF NO. 29-1129.

Figure 2:
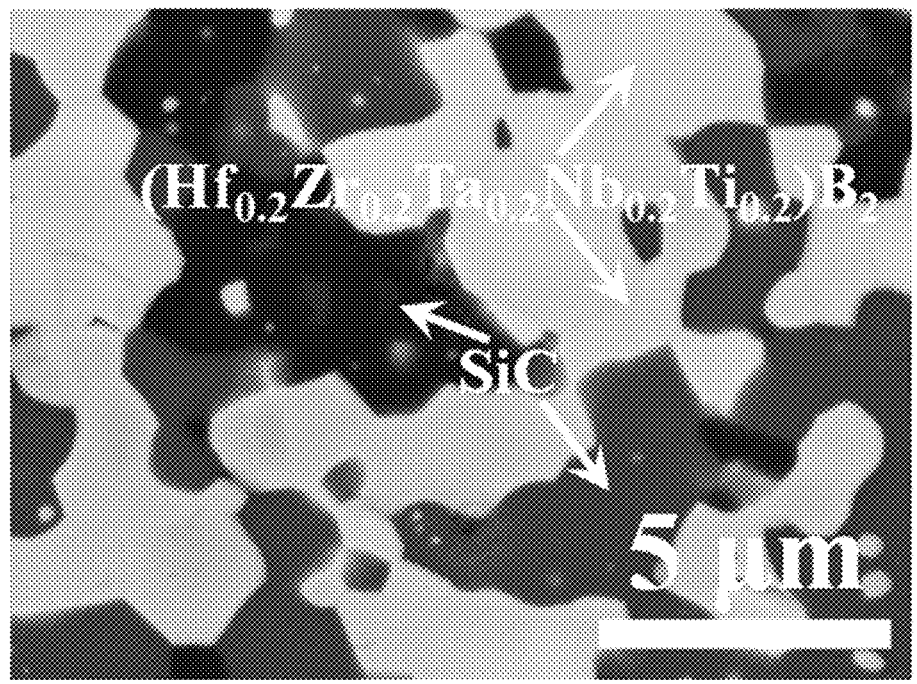
FIG. 2 displays a scanning electron microscopy (SEM) image of the high-entropy carbide-high-entropy diboride-SiC multiphase ceramic prepared in Example 2.

Referring to FIG. 2, the high-entropy carbide-high-entropy diboride-SiC multiphase ceramic provided herein was relatively dense and uniform with a relative density of 98.6% and a particle size of 3 μm. SiC was uniformly dispersed in the high-entropy diboride.

Figure 3:
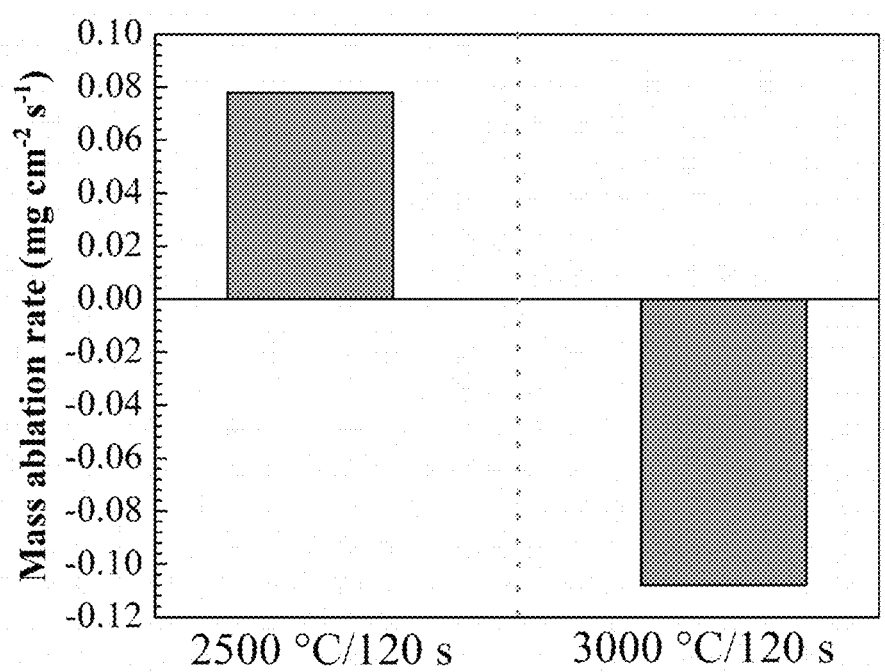
FIG. 3 illustrates a mass ablation rate of the high-entropy carbide-high-entropy diboride-SiC multiphase ceramic prepared in Example 2.

Referring to FIG. 3, a mass ablation rate of the high-entropy carbide-high-entropy diboride-SiC multiphase ceramic provided herein was 0.078 mg cm$^{-2}$ s$^{-1}$ under a 2500° C. oxyacetylene flame for 120 s. A mass ablation rate of the high-entropy carbide-high-entropy diboride-SiC multiphase ceramic provided herein was –0.108 mg Cm$^{-2}$ s$^{-1}$ under a 3000° C. oxyacetylene flame for 120 s.

Accordingly, the high-entropy carbide-high-entropy diboride-SiC multiphase ceramic, prepared through pressureless sintering based on synergetic effect of carbon-boron-silicification reaction and solid solution with SiB$_6$ as Si source and B source, is near fully dense (relative density of 99%), and has evenly distributed phases and small grain size (3 μm). The multiphase ceramic prepared by the method provided herein has great crystallinity, and the high-entropy diboride and SiC are uniformly dispersed in the high-entropy carbide to form a dense and stable oxide protective layer after oxidation and ablation, which preferably forms with the synergistically induced by Si and B. Thereby, the ablation resistance of the high-entropy ultrahigh temperature multiphase ceramic is greatly improved. The method provided herein has simple preparation and low sintering temperature, and the element, phase composition, and microstructure are controllable. The method provided herein can performed by one step, and is suitable for preparation of any size and shape ceramics. The multiphase ceramic has excellent ablation resistance, which has a mass ablation rate of slightly larger than –0.05 mg cm$^{-2}$ s$^{-1}$ under the 2500° C. oxyacetylene flame for 120 s, and a mass ablation rate of not larger than –0.2 mg cm$^{-2}$ s$^{-1}$ under the 3000° C. oxyacetylene flame for 120 s, and has no obvious cracks on the surface.

Example 3

Provided was a method for preparing an ablation-resistant high-entropy carbide-high-entropy diboride-SiC multiphase ceramic, which included the following steps.

(S1) Commercially-available HfO$_2$ powder, ZrO$_2$ powder, Ta$_2$O$_5$ powder, Nb$_2$O$_5$ powder and TiO$_2$ powder (particle size: about 100 nm, and purity≥99.9%) were mixed by ball milling in a planetary ball mill in a molar ratio of 2:2:1:1:2 to obtain a mixed powder, where the ball milling was performed in isopropyl alcohol at 300 rpm for 60 h, and a weight ratio of the mixed powder to balls was 1:20. Then the mixed powder was dried, and grounded in an agate mortar.

(S2) The mixed powder, nano carbon black (50 nm) and SiB$_6$ powder (3-8 μm) were subjected to ball milling in a planetary ball mill to obtain a precursor powder, in which a molar ratio of transition metal atoms of the mixed powder to the nano carbon black to the SiB$_6$ powder was 10:32:1; the ball milling was performed in isopropyl alcohol at 300 rpm for 36 h; and a weight ratio of the precursor powder to balls was 1:20.

(S3) The precursor powder was pre-pressed into a cylindrical blank by cold isostatic pressing, and was subjected to stepwise pressureless sintering through the following temperature program to obtain the uniform and dense high-entropy carbide-high-entropy diboride-SiC multiphase ceramic with a relative density of 99%: rising from room temperature to 2000° C. at a rate of 20° C./min; 2000° C. for 10 min; decreasing to 1900° C. at a rate of 60° C./min; 1900° C. for 4 h; and decreasing to room temperature at 20° C./min, where a vacuum degree was controlled at 0.005 Pa.

Described above are merely preferred embodiments of the disclosure, which are not intended to limit the disclosure. It should be understood that replacements, modifications and variations made by those skilled in the art without departing from the spirit and scope of the disclosure shall fall within the scope of the disclosure defined by the appended claims.

What is claimed is:

1. A method for preparing an ablation-resistant high-entropy carbide-high-entropy diboride-silicon carbide (SiC) multiphase ceramic, comprising:
   (S1) mixing a transition metal oxide mixed powder, nano carbon black and a silicon hexaboride (SiB$_6$) powder to obtain a precursor powder; and
   (S2) subjecting the precursor powder to pressureless sintering to obtain the high-entropy carbide-high-entropy diboride-SiC multiphase ceramic;
   wherein a relative density of the high-entropy carbide-high-entropy diboride-SiC multiphase ceramic is 96% or more; and
   wherein the transition metal oxide mixed powder comprises hafnium oxide (HfO$_2$), zirconium dioxide (ZrO$_2$), tantalum pentoxide (Ta$_2$O$_5$), niobium oxide (Nb$_2$O$_5$) and titanium dioxide (TiO$_2$) in a molar ratio of 2:2:1:1:2; and
   the pressureless sintering is performed in a stepwise manner through the following temperature program:
   rising from room temperature to 1900-2100° C. at a rate of 10-50° C./min; 1900-2100° C. for 5-30 min; decreasing to 1600-1900° C. at a rate of 50-100° C./min; 1600-1900° C. for 1-8 h; and decreasing to room temperature at a rate of 10-50° C./min; wherein a vacuum degree of the pressureless sintering is controlled at 0.001-0.05 Pa.

2. The method of claim 1, wherein a molar ratio of transition metal atoms of the transition metal oxide mixed powder to the nano carbon black to the SiB$_6$ powder is (1-20):(1-64):(0-8), and a molar content of the SiB$_6$ powder is greater than zero.

3. The method of claim 1, wherein a particle size of the transition metal oxide mixed powder is 100 nm; a particle size of the nano carbon black is 50 nm; and a particle size of the SiB$_6$ powder is 3-8 μm.

4. The method of claim 1, wherein step (S1) comprises:
   (S1-1) subjecting HfO$_2$, ZrO$_2$, Ta$_2$O$_5$, Nb$_2$O$_5$ and TiO$_2$ to ball milling and drying to obtain the transition metal oxide mixed powder; and
   (S1-2) subjecting the transition metal oxide mixed powder, the nano carbon black and the SiB$_6$ powder to ball milling and drying to obtain the precursor powder.

5. The method of claim 4, wherein in step (S1-1), the ball milling is performed in isopropyl alcohol at 200-600 rpm for 8-60 h, and a ratio of a total weight of HfO$_2$, ZrO$_2$, Ta$_2$O$_5$, Nb$_2$O$_5$ and TiO$_2$ to a weight of balls is 1:(10-20); and
   In step (S1-2), the ball milling is performed in isopropyl alcohol at 200-600 rpm for 8-60 h, and a ratio of a total weight of the transition metal oxide mixed powder, the nano carbon black and the SiB$_6$ powder to a weight of balls is 1:(10-20).

6. The method of claim 1, wherein before the pressureless sintering, the precursor powder is pre-pressed into a cylindrical blank by cold isostatic pressing.

* * * * *